(12) United States Patent
Fong et al.

(10) Patent No.: US 8,447,840 B1
(45) Date of Patent: May 21, 2013

(54) METHOD AND SYSTEM FOR TRANSFERRING CONTROL OF A USER INTERFACE OF A CONTENT DISTRIBUTION SYSTEM

(76) Inventors: Noreen Fong, Cerritos, CA (US); Samuel V. Irvine, Long Beach, CA (US); Walter F. Filbrich, Manhattan Beach, CA (US); Gregory Vagnati, Los Angeles, CA (US)

(*) Notice: Subject to any disclaimer, the term of this patent is extended or adjusted under 35 U.S.C. 154(b) by 178 days.

(21) Appl. No.: 12/881,054

(22) Filed: Sep. 13, 2010

Related U.S. Application Data

(60) Provisional application No. 61/242,350, filed on Sep. 14, 2009.

(51) Int. Cl.
*G06F 13/00* (2006.01)

(52) U.S. Cl.
USPC ............................ 709/219; 709/228; 719/328

(58) Field of Classification Search
USPC ................. 709/217, 219, 223, 225, 227, 228, 709/230, 231, 250
See application file for complete search history.

(56) References Cited

U.S. PATENT DOCUMENTS

| | | | |
|---|---|---|---|
| 8,060,637 B2 * | 11/2011 | Kayanuma et al. | 709/231 |
| 2004/0117845 A1 | 6/2004 | Karaoguz et al. | |
| 2006/0291507 A1 | 12/2006 | Sarosi et al. | |
| 2007/0005783 A1 * | 1/2007 | Saint-Hillaire et al. | 709/230 |
| 2007/0053653 A1 * | 3/2007 | Huntington | 386/46 |
| 2008/0077852 A1 | 3/2008 | Fleishman et al. | |
| 2008/0120673 A1 | 5/2008 | Dong et al. | |
| 2008/0178219 A1 * | 7/2008 | Grannan | 725/41 |
| 2009/0100474 A1 * | 4/2009 | Migos | 725/61 |
| 2010/0127912 A1 * | 5/2010 | Rye et al. | 341/176 |
| 2011/0032424 A1 * | 2/2011 | Vanduyn et al. | 348/553 |

FOREIGN PATENT DOCUMENTS
EP    1259069 A1   11/2002

* cited by examiner

*Primary Examiner* — Viet Vu

(57) ABSTRACT

A method and system for controlling a user interface displayed at a client device includes a client device and a server device that communicates a first remote user interface from the server device to the client device. The client device displays the first remote user interface and communicates key signals to the server device. The server device communicates a first transfer control signal to the client device. The client device displays a client native interface and communicates a second transfer control signal to the server device. The server device communicates the second remote user interface to the client device. The client device displays a second remote user interface at the client device.

22 Claims, 9 Drawing Sheets

METHOD AND SYSTEM FOR TRANSFERRING CONTROL OF A USER INTERFACE OF A CONTENT DISTRIBUTION SYSTEM

CROSS-REFERENCE TO RELATED APPLICATIONS

This application claims the benefit of U.S. Provisional Application No. 61/242,350, filed on Sep. 14, 2009. The entire disclosure of the above application is incorporated herein by reference.

TECHNICAL FIELD

The present disclosure relates generally communicating between a server and a client device, and, more specifically, to controlling the display of user interfaces by different devices within a content distribution system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Controlling the setup and control of the various functions is important. User interfaces typically can control various parameters to customize the user experience. The content of the program guide, audio and video are all examples of typically customizable features. In a typical content system the customizable features are controlled at the set top box.

SUMMARY

The present disclosure is described with respect to a distributed system having a server device and one or more client devices. Both the client devices and server devices may control various customizable functions. The present disclosure prevents conflicts so that the display is controlled by one device at a time.

In one aspect of the disclosure, a method includes communicating content from a server device to a client device, communicating a first remote user interface from the server device to the client device, displaying the first remote user interface at the client device, communicating key signals from the client device to the server device, communicating a first transfer control signal from the server device to the client device, displaying a client native interface at the client device, communicating a second transfer control signal from the client device to the server device, thereafter, communicating the second remote user interface from the server device to the client device and thereafter, displaying a second remote user interface at the client device.

In a further aspect of the disclosure, a system includes a client device and a server device that communicates a first remote user interface from the server device to the client device. The client device displays the first remote user interface and communicates key signals to the server device. The server device communicates a first transfer control signal to the client device. The client device displays a client native interface and communicates a second transfer control signal to the server device. The server device communicates the second remote user interface to the client device. The client device displays a second remote user interface at the client device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
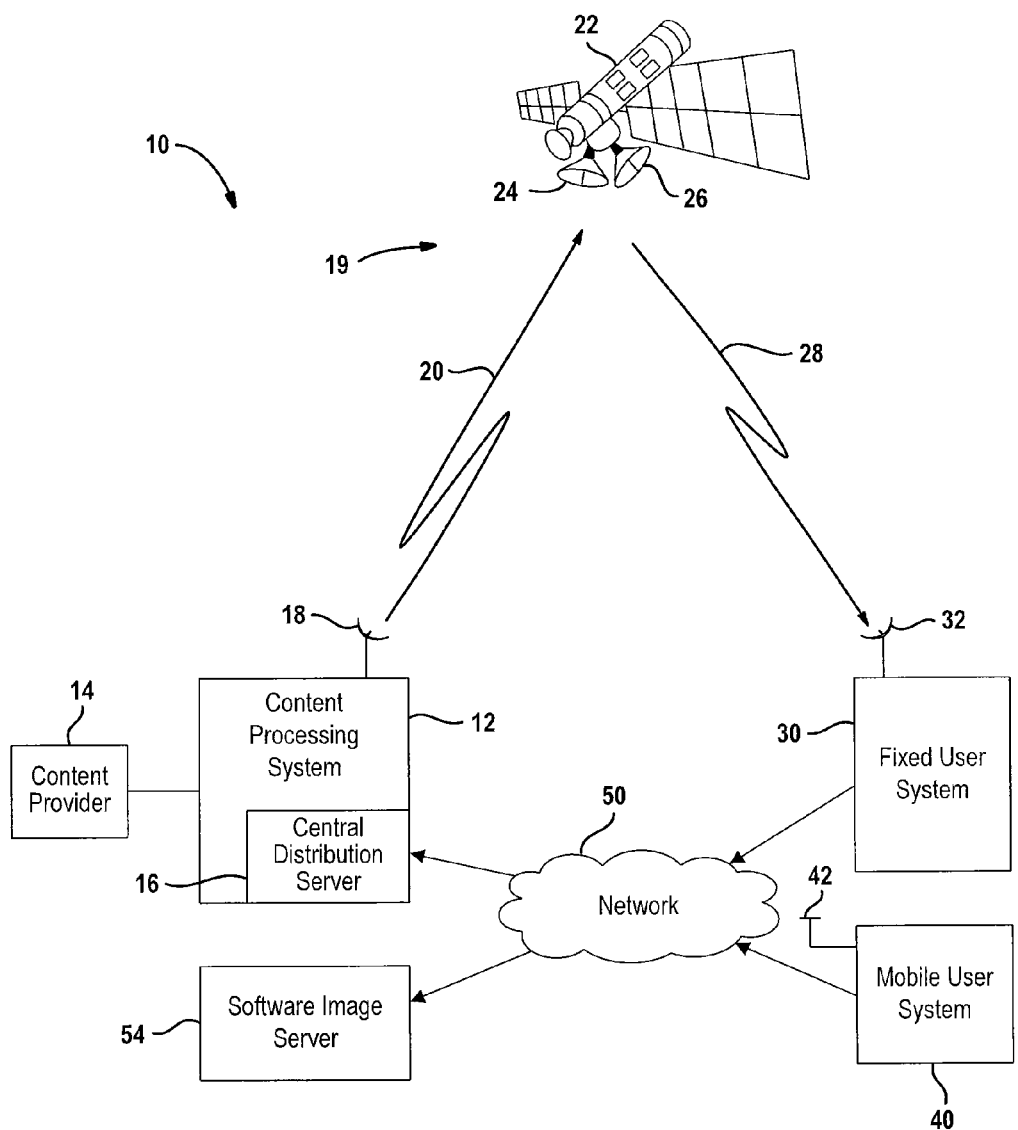
FIG. 1 is a high level block diagrammatic view of a satellite distribution system.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol-(IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
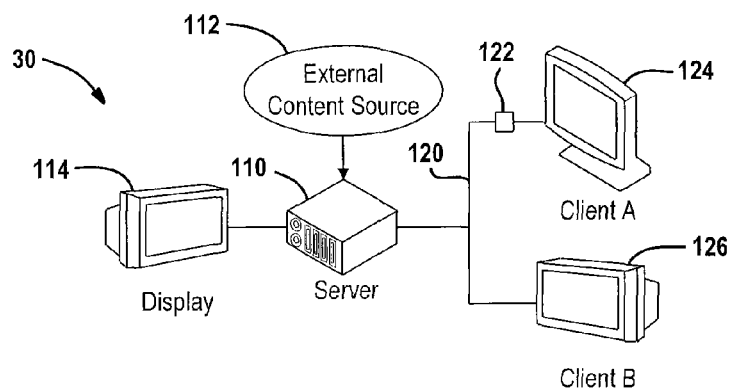
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, and the second client, Client B, are in communication directly with the server 110, the network may be referred to as a closed network. Various numbers of clients may be connected to the local area network 120.

Figure 3:
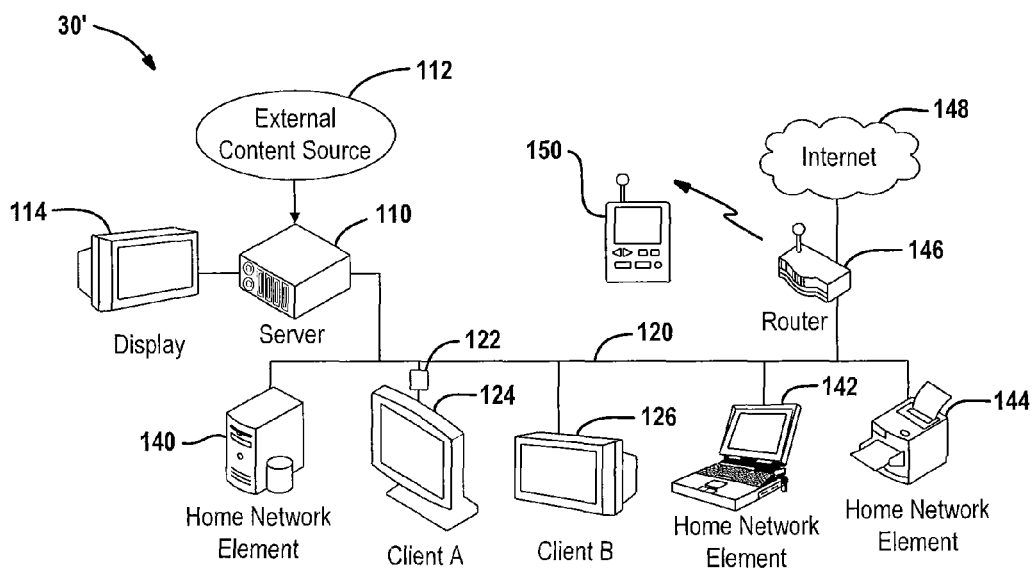
FIG. 3 is a block diagrammatic view of a second embodiment of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
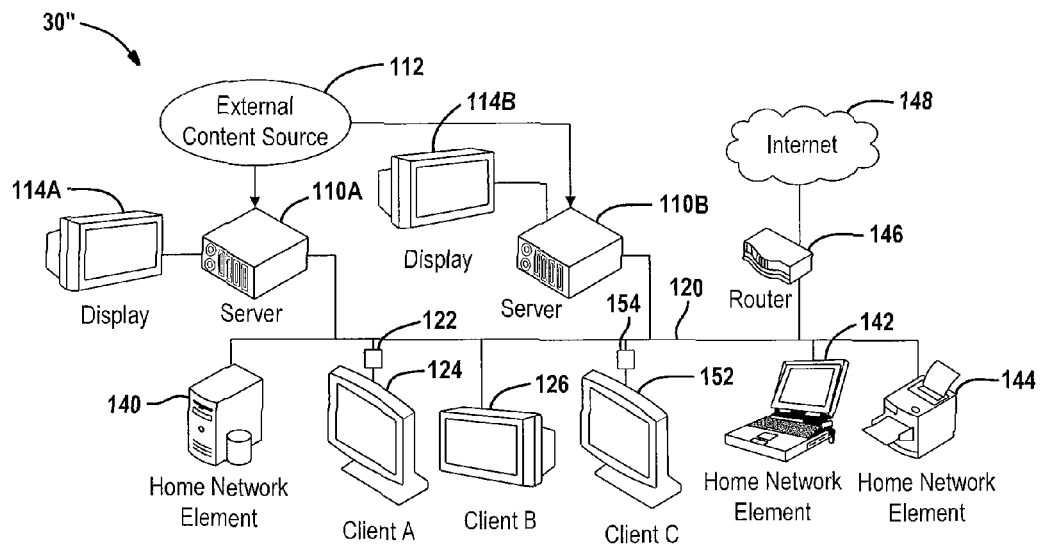
FIG. 4 is a block diagrammatic view of a third embodiment of a network topology.

Referring now to FIG. 4, another example of a fixed user system 30" is illustrated. In this embodiment, the same elements from FIGS. 2 and 3 are provided with the same reference numerals. The local area network 120 may also include two servers 110A and 110B. Each server may include an optional display device 114A, 114B, respectively. In this embodiment a third client, Client C, is illustrated having a display 152 and a client device 154.

Figure 5:
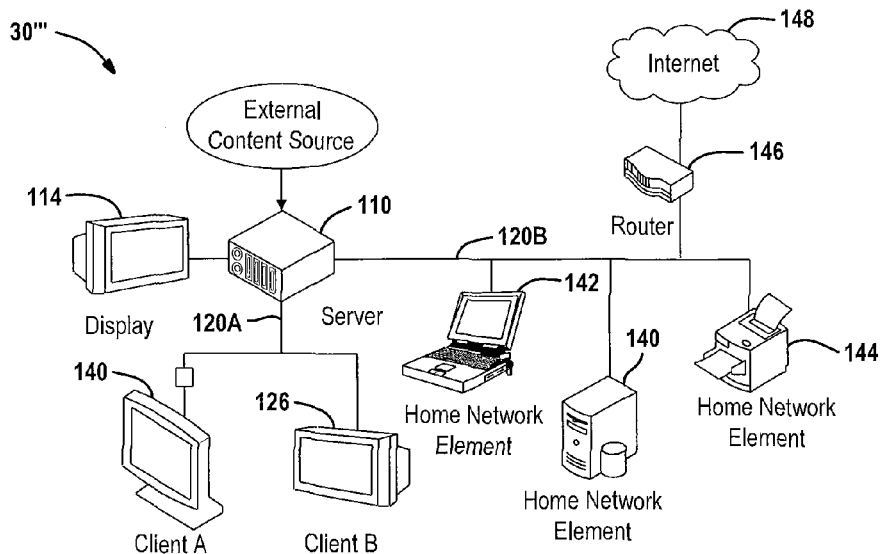
FIG. 5 is a block diagrammatic view of a fourth embodiment of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
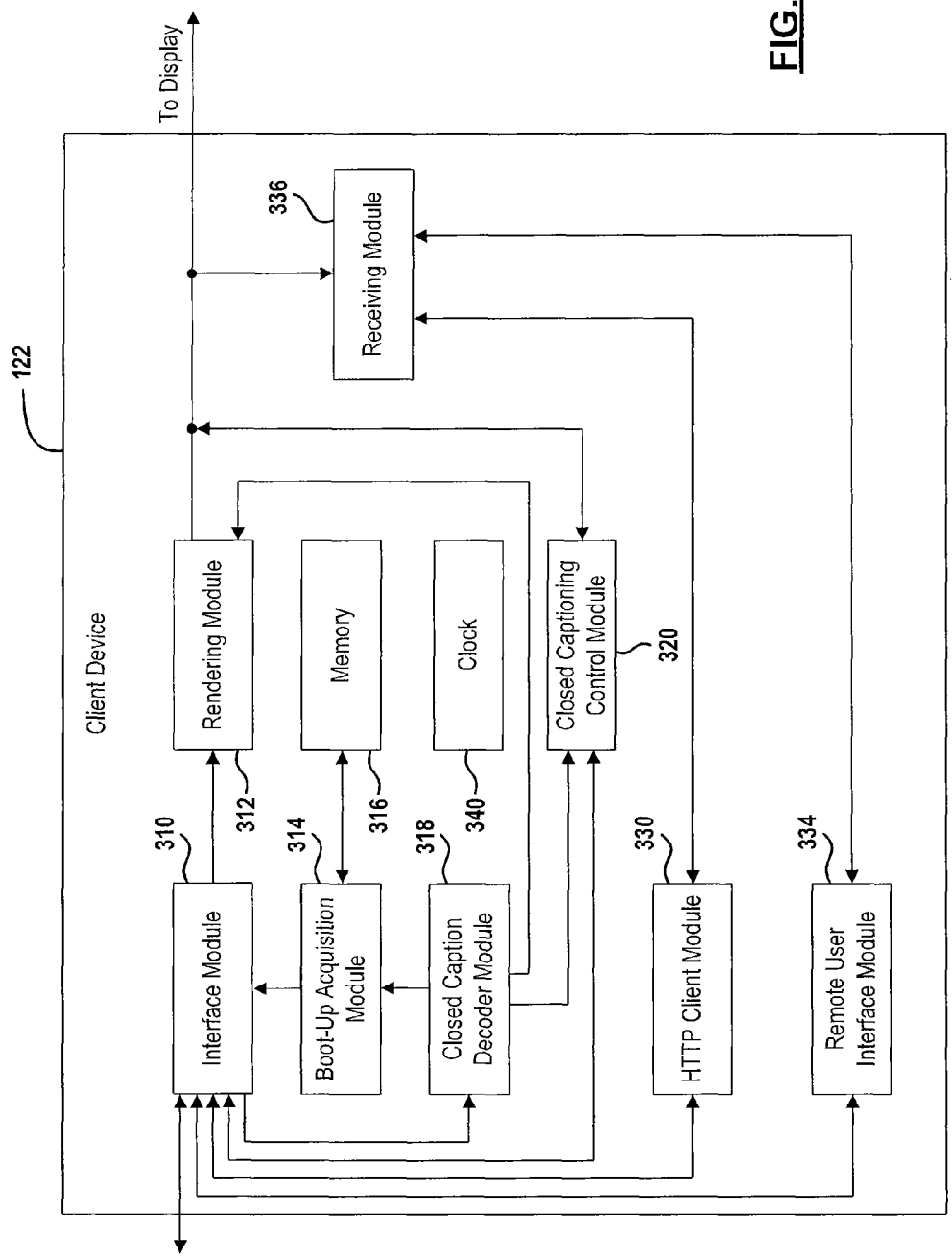
FIG. 6 is a simplified block diagrammatic view of a client device.

Referring now to FIG. 6, a client device 122 is illustrated in further detail. The client device may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 may include a rendering module 312. The rendering module 312 receives formatted signals through the local area network that are to be displayed on the display. The rendering module 312 merely places pixels in locations as instructed by the formatted signals. By not including a decoder, the rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning display area may be overlayed upon the rendered signals from the rendering module 312 when displayed upon the display associated with the client device.

The closed-captioning decoder module 318 may be in communication with the closed-captioning control module 320. The closed-captioning control module 320 may control the enablement and disablement of the closed-captioning as well as closed-captioning setup such as font style, position, color and opacity. When a closed-captioning graphical user interface menu is desired, the closed-captioning control module 320 may generate a closed-captioning menu. The closed-captioning control module 320 may receive an input from a user interface such as a push button on the client device or on a remote-control device associated with the client device 122.

The server device may pass control of the display to the client device for the closed-captioning menu to be displayed. The menus may be local and associated with the closed-captioning control module 320. The menus may actually be stored within a memory associated with the closed-captioning control module 320 or within the memory 316 of the client device.

When the server device passes control to the client device 122, the closed-captioning menu will appear on the display associated with the client device 122. Parameters for closed-captioning, including turning on the closed-captioning and turning off the closed-captioning may be performed by the system user. Once the selections are made, the control is passed back from the client device to the server device which maintains the closed-captioning status. The server device may then override the client device 122 when the closed-captioning is turned on and the program type does not correspond to a closed-captioning type. As will be described below, the server device may override the closed-captioning when the closed-captioning is not applicable to a program-type display such as a menu or program guide.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and audio and video to provide a full featured user interface within the client. Thus, the remote user interface module may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

Figure 7:
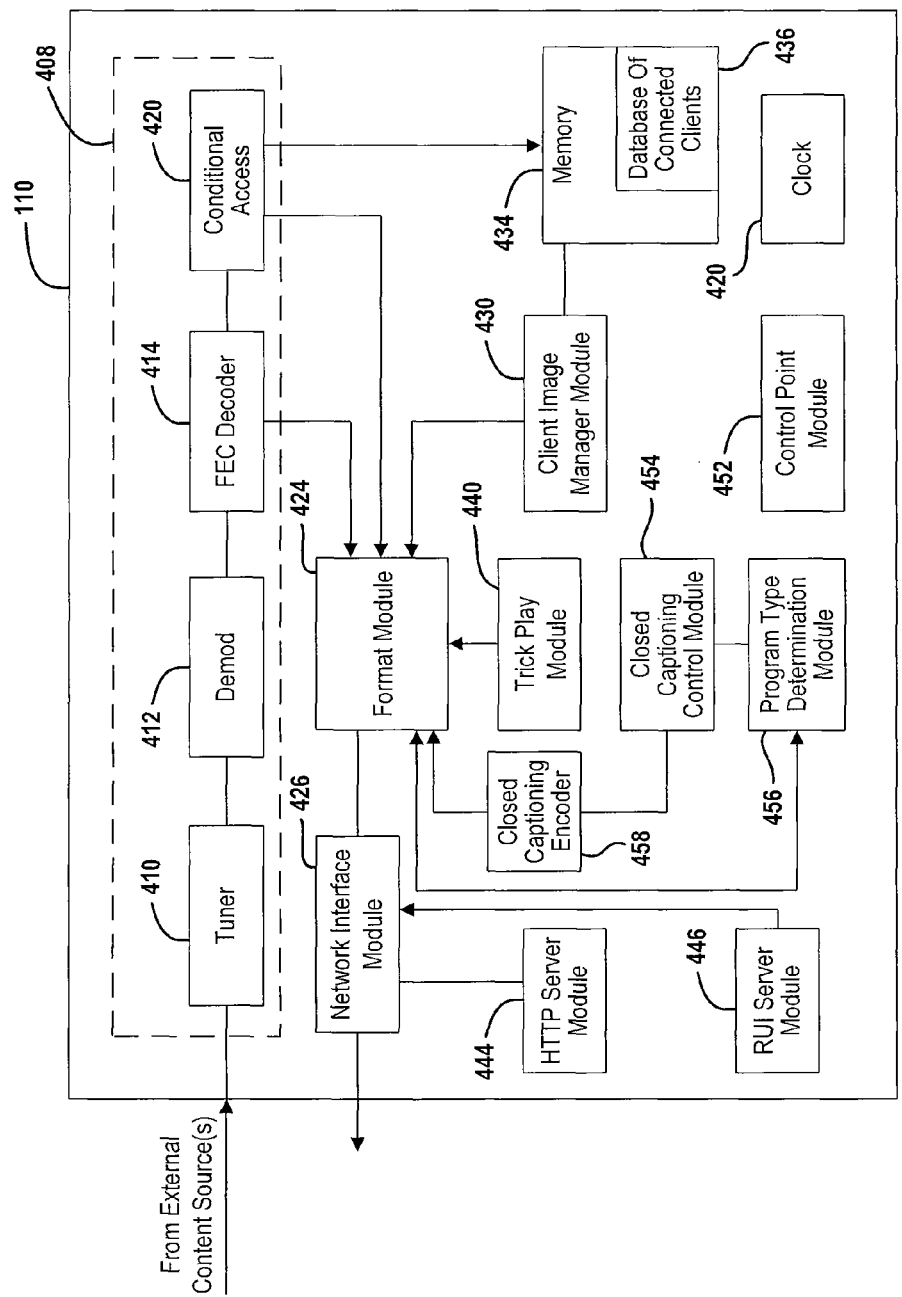
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

A closed-captioning control module 454 may also be disposed within the server device 110. The closed-captioning control module 454 may receive inputs from a program-type determination module 456. The program-type determination module 456 may receive the programming content to be displayed at a client device and determine the type of program or display that the client device will display. The programming-type determination module 456 is illustrated as being in communication with the format module 424. However, the program-type determination module 456 may be in communication with various other modules such as the decoder module 414.

The program-type determination module 456 may make a determination as to the type of programming that is being communicated to the client device 122. The program-type determination module 456 may determine whether the program is a live broadcasted program, a time-delayed or on-demand program, or a content-type that is exempt from using closed-captioning such as a menu or program guide. When the closed-captioning exempt programming is being communicated to the client device 122, a closed-captioning disable signal may be provided to the closed-captioning control module 454 to prevent the closed-captioning from appearing at the display associated with the client device 122. The closed-captioning disable signal may be communicated from the closed-captioning control module 454 through the format module 424 or network interface module 426 to the client device 122. The client device, through the closed-captioning control module 320 illustrated in FIG. 6, may disable the closed-captioning until a non-exempt programming- or content-type or a closed-captioning enable signal is communicated to the client device 122.

The closed-captioning control module 454 may also be in communication with a closed-captioning encoder 458. The closed-captioning encoder 448 may encode the closed-captioning in a format so that the closed-captioning decoder module 318 of FIG. 6 may decode the closed-captioning signal. The closed-captioning encoder module 458 may be optional since a closed-captioning signal may be received from the external source.

Figure 8:
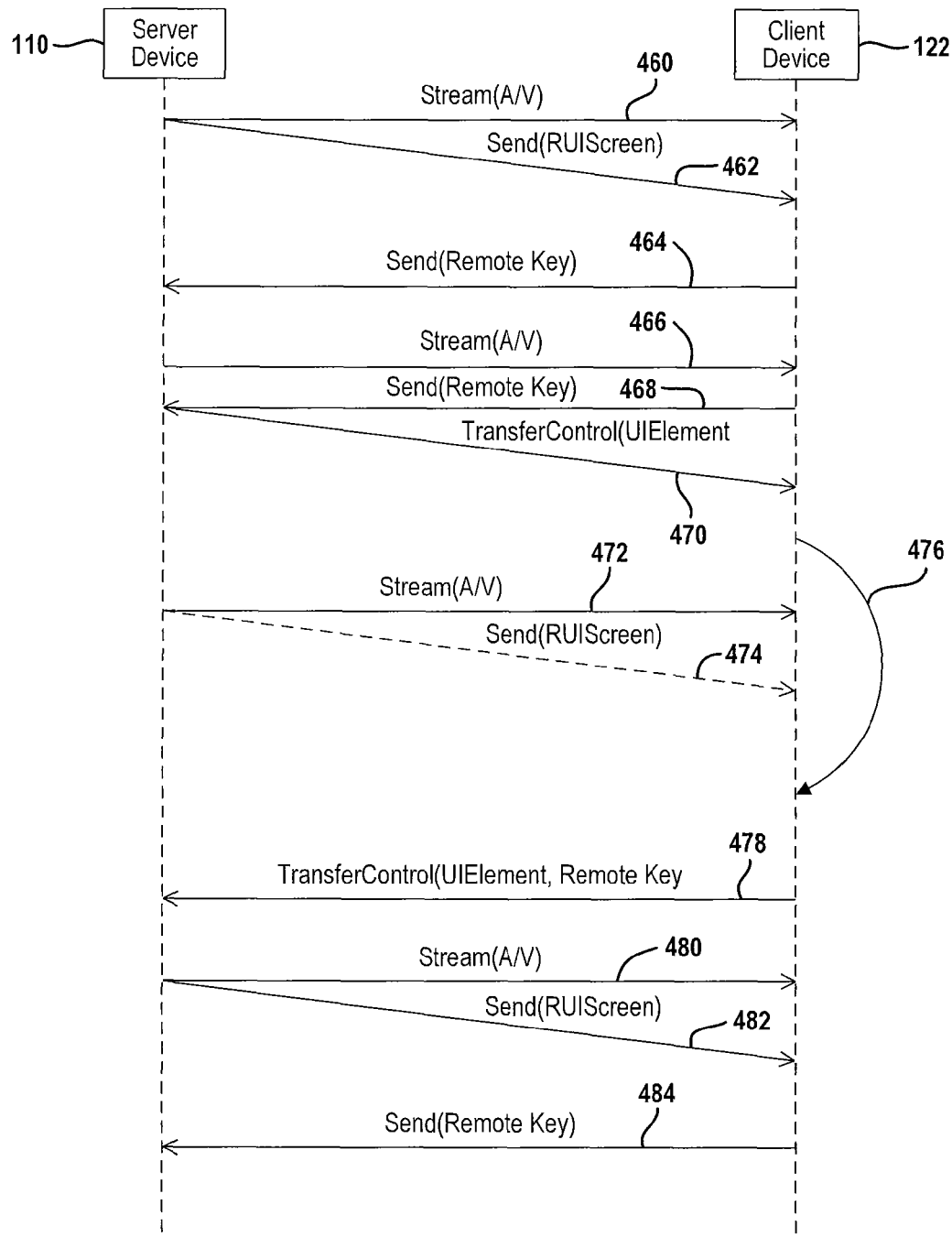
FIG. 8 is a flowchart of a method for transferring control of a user interface between a server device and a client device.

Referring now to FIG. 8, a method for transferring control of a user interface between a server device 110 and a client device 122 is set forth. In the following example, the server is the primary source for the user experience with various screens and may or may not include audio-video content. The client device is a display associated therewith that is capable of receiving remote user interfaces and audio-video content. In the following example, one of the server device 110 or client device 122 is in control of displaying the user interface at any time.

In step 460, audio-video signals may be streamed to the client device. The signals may be audio, video or audio and video signals. The audio and video signals are streamed from the server 110 to the client device 112. In step 462, a remote user interface and associated remote user interface commands are sent to the client device 122 from the server device 110 so that various screens of remote user interface commands may be displayed. In step 462, a remote user interface command signal may be passed to the client device with associated data for forming the display. This may be performed numerous times depending on the screens that the user wishes to access. In step 464, a remote key command is communicated from the client device 122 to the server device 110. The remote key command signal may correspond to keys or buttons that are depressed or selected at the client device in response to a remote user interface. The remote key command signal 464 may correspond to a selection signal for selecting content or actions in association with the remote user interface. The content or actions may select other remote user interface screens or the like. In this example, step 464 maintains control at the server device 110 of the user interface at the client device. In step 466, streaming signals, if applicable, may continue to be streamed to the client device. As mentioned above, audio-video signals, audio signals or video signals may continue to be streamed from the server device to the client device.

In step 468, a remote key signal corresponding to a user element that requires transfer of control between the server device 110 and the client device 122 is illustrated. In step 470, a transfer control signal including a user interface element is communicated from the server device 110 to the client device. The user interface element communicates the context of the user action. When the transfer control signal is received by the client device 122, the client may now control the user interface and generate client-native interfaces. The remote keys or other button selections may be acted upon by the client device 122. In step 472, audio-video streams may continue to be provided from the server device 110 to the client device 122. Also, remote user interface signals may also continue to be communicated from the server device 110 to the client device 122. Remote user interface signals may be ignored by the client device when the client device controls the user interface. It should also be noted that remote user interface signals may also be prevented from being sent by the server device 110 until the client device transfers control back to the server device. In step 476, native screens and remote key processing may all be controlled by the client device 122 when the client device has control of the user interface.

In step 478, when the client has completed its operation, transfer may be controlled back to the server device 110. The transfer control signal may include a user interface element and a remote key element. The user interface element may provide the server device 110 with an indication of what screen the client device last displayed. The remote key element may provide the last key pressed while the client device 122 was in control of the user interface.

In step 480, audio-video signals may continue to be streamed from the server device 110 to the client device 122. Also, in step 482, remote user interface screens may be communicated from the server device 110 to the client device 122. Both the streaming of audio-video signals and remote user interface signals in steps 480 and 482 are provided as needed.

In step 484, once control has been transferred in step 478, the server device 110 communicates remote key signals to the client device 122 instead of locally ingesting them when a client native interface is generated. Thus, the server device 110 may again control the user interface and receive appropriate remote key signals corresponding to the selections by a user that is associated with the client device 122.

Figure 9:
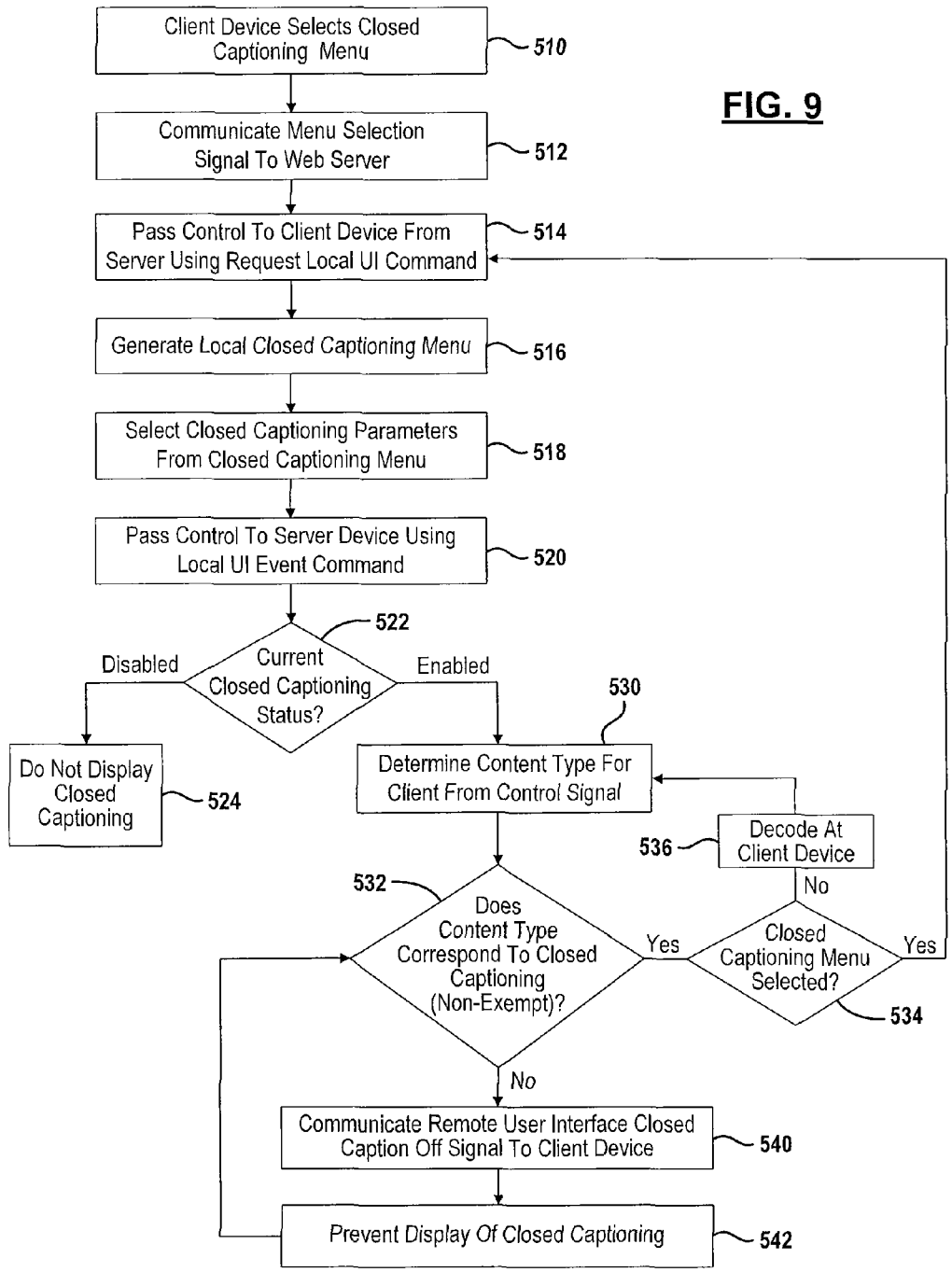
FIG. 9 is a flowchart of a method for controlling closed-captioning.

Referring now to FIG. 9, a method for performing closed-captioning control is set forth. The method of providing user interfaces may follow the process of FIG. 8 as described above. The closed-captioning may be off or not displayed prior to the method. In step 510, the client device selects a closed-captioning menu. As mentioned above, the closed-captioning menu may be selected from a remote control device or push buttons on the client device. The push button actions may correspond to a menu display such as a remote user interface. Because the client device receives display signals directly from the server device 110, the server device 110 has the menu selection signal communicated from the client device in step 512.

Step 514 passes control to the client device from the server using a request local user interface command. In step 516, the closed-captioning menu is generated on the display associated with the client device from within the client device. In step 518, closed-captioning parameters may be selected from the closed-captioning menu. As will be illustrated below, various types of selections may be made including turning on and off the closed-captioning as well as the font style, position, the color and opacity of the closed-captioning display. After the selections are made and the menu is exited, step 520 passes control to the server device using a command such as a local UI event command. The steps 510 to 520 may also be used for various other types of menu structures. Steps 510-520 correspond generally with FIG. 8.

In step 522, the server device and client device then operate with the server device providing the client device with programs and content. In step 522, the status of the closed-captioning is determined at the client device in step 522. In step 522, if the current closed-captioning status is set at the client device to be disabled, step 524 is performed. In step 524, closed-captioning is not displayed from the client device regardless of any status.

Referring back to step 522, when the current closed-captioning status at the client device is enabled, step 530 is performed. In step 530, the content type for the client device is determined from the content signal that is being provided or about to be provided to the client device. That is, by looking at a content-type identifier in the content-type signal, the content type may be determined. The content type may also be determined within the server device based on its origin. For example, a program guide menu or other type of on-demand menu, or the like, may be generated internally from within the client server.

After step 530, step 532 determines when the content type corresponds to a closed-captioning type signal or non-exempt signal, step 534 is performed. In step 534, it is determined whether a closed-captioned menu has been selected. If the closed-captioned menu has been selected, step 514 is again performed. In step 534, if the closed-captioned menu has not been selected, step 536 decodes the closed-captioning signals and displays the closed-captioning at the client device. After step 536, the signal is again monitored for content type since the displayed signal may change at any time.

Referring back to step 532, when the content type does not correspond to a closed-captioning type, meaning the closed-captioning is exempt from being displayed on the display associated with the client device, step 540 is performed. In step 540, a remote user interface closed-captioned OFF signal may be communicated to the client device. The remote user interface closed-captioned OFF signal provides a disable signal to disable the closed-captioning at the client device even though the closed-captioning is enabled at the client device. The remote user interface closed-captioned OFF signal may be used to temporarily override the closed-captioning at the client device and prevent the closed-captioning from being displayed in step 542. The remote user interface closed-captioning OFF signal may block the closed-captioning from being displayed until a remote user interface closed-captioning ON signal is provided. When the menu or other closed-captioning exempt content is not being displayed, the remote user interface closed-captioning ON signal may be communicated to the client device. The system continues back to step 532.

Figure 10:
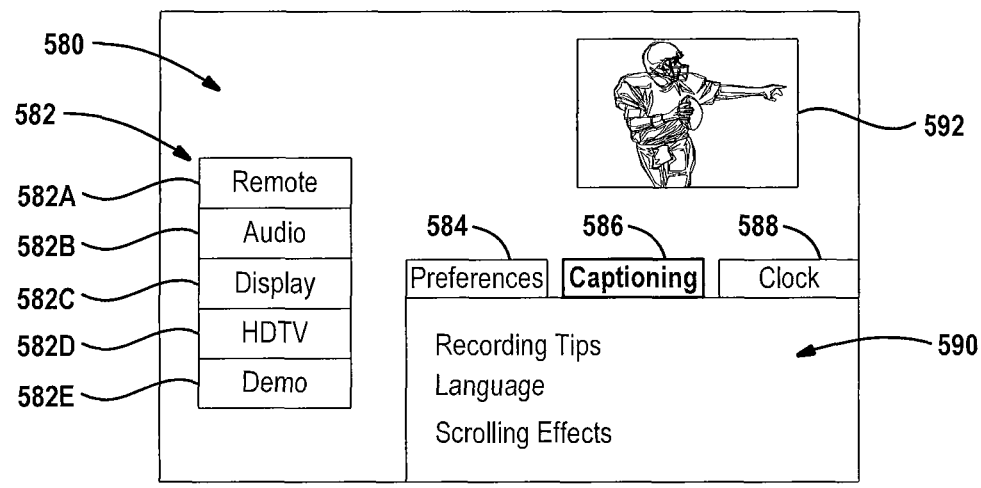
FIG. 10 is a screen display of a menu generated by the server device for entering a closed-captioning menu.

Referring now to FIG. 10, a screen display illustrating various commands associated with a remote user interface 580 is set forth. As mentioned above, the remote user interface 580 is controlled by the server device 110. When appropriate selections have been provided by the remote control device or other control device, the screen display may provide various set-up options 582. The set-up options 582 may include graphical buttons or selections that, when related, communicate an identifier signal corresponding to the selection. The graphical buttons or selections may include a remote selection 582A, an audio selection 582B, a display selection 582C, an HDTV display selection 582D and a demo selection 582E. The display selection 582C is highlighted for selection. By selecting the display 582C, various other options such as preferences 584, captioning 586 and clock 588 may be displayed. By selecting one of the selections 584-588, various other actions 590 may be displayed. In this example, recording tips, language and scrolling effects are all actions provided on the user interface.

The remote user interface 580 may also include an audio-video screen display 592. As mentioned above, the audio-video signals may continue to be communicated to the client device 122 from the server device 110 during remote user interface display and client native interface display.

When the captioning selection 586 is selected, the transfer of control of the user interface may switch from the server device 110 to the client device 122 as is set forth above in FIG. 8.

Figure 11:
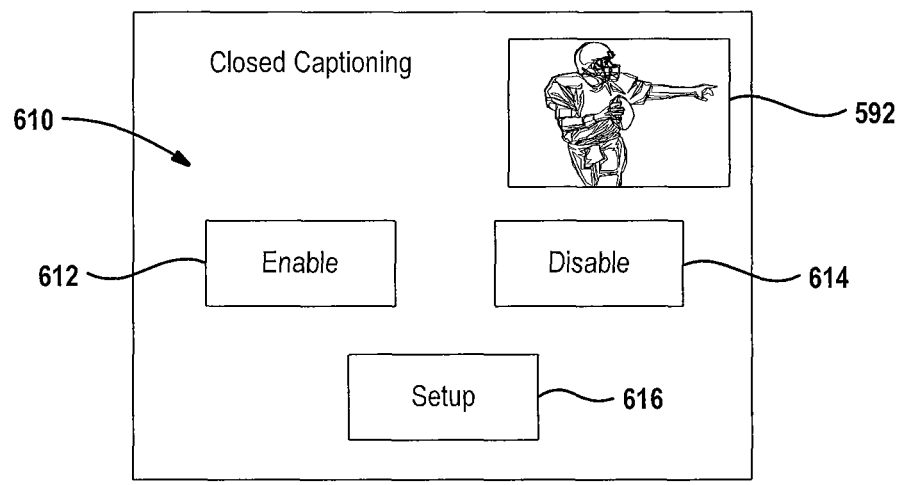
FIG. 11 is a screen display of a closed-captioning menu generated by the client device.

Referring now to FIG. 11, an example of a simplified closed-captioning client native interface 610 is illustrated. The menu of FIG. 11 is generated by the client device 122. Selection buttons 612 and 614 correspond to an enable function and a disable function, respectively. By selecting the enable function 612 or the disable function 614, the control at the user device may be selected. As mentioned above, the server device 110 may override the closed-captioning enable signal when closed-captioning is not applicable to the content type such as an on-demand menu or another type of menu is to be displayed through the display associated with the user device.

A setup selection 616 may also be displayed on the closed-captioning menu 610. When the setup selection is selected, various closed-captioning parameters may be set.

Figure 12:
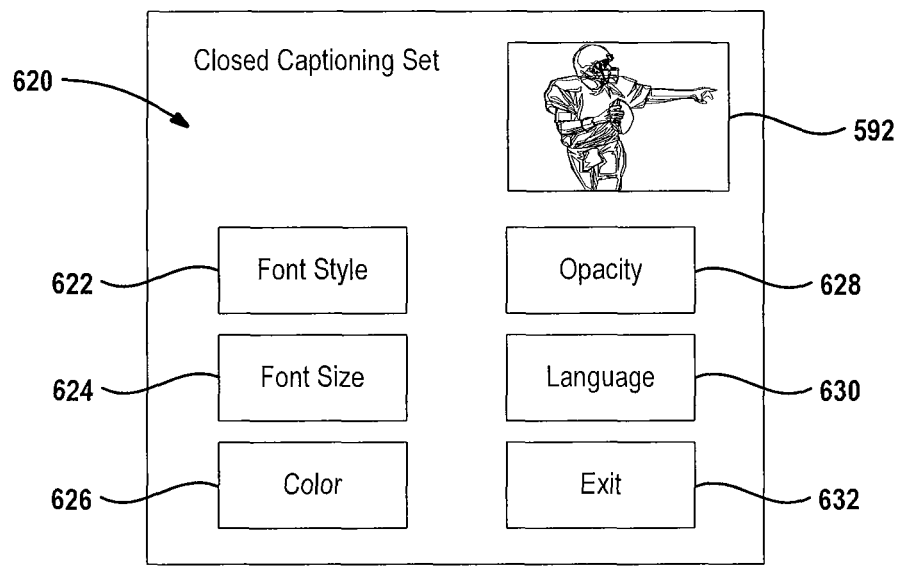
FIG. 12 is a screen display of a closed-captioning setup menu.

Referring now to FIG. 12, when the setup option is selected in the menu 610 of FIG. 11, the menu 620 of FIG. 12 may be displayed. Of course, other types of controls may also be provided. Examples of controlling the closed-captioning include controlling the font style using font style selection 622, the font size using the font size selection 624, the color type using color selector 626, the font opacity using the opacity selector 628, the closed-captioning language using the language selector 630 and exiting out of client native interface using the exit selector 632. The opacity selector 628 may control the amount of opacity for the font displayed on the screen. The amount of opacity will control the amount of background that may be shown through each of the individual characters of the closed-captioning display. Other functions used for closed-caption setup will be evident to those skilled in the art. The audio-video display 592 may also continue to be displayed.

Figure 13:
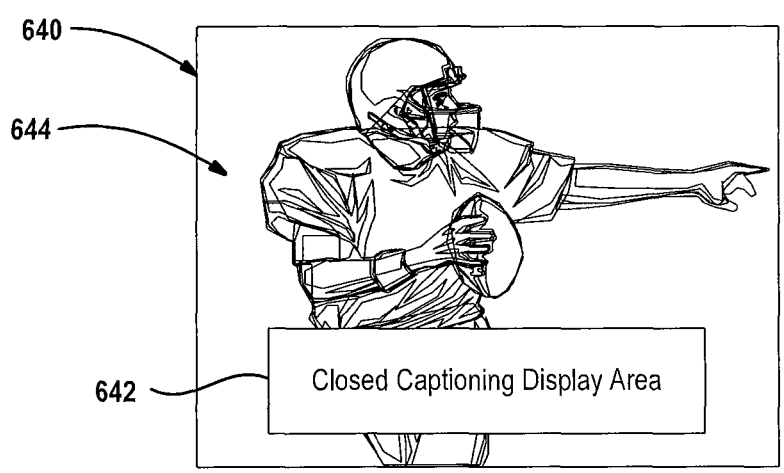
FIG. 13 is a screen display illustrating a closed-captioning display on a television display.

Referring now to FIG. 13, a television display 640 is illustrated having a closed-captioning display area 642 and a television program area 644. When the closed-captioning display area 642 is disabled, then the area 642 is not displayed on the display 640. The closed-captioning area 642 can be controlled at the client device or the server can override the client device when the closed-captioning display area 642 is displayed. Although the position is at the bottom of the screen as illustrated, the position may be changed within the closed-captioning data.

As is described above, the closed-captioning server may dynamically control the closed-captioning on the client device even though the remote client is performing the decoding of the closed-captioning content. The server device may override the closed-captioning selection at the client device so that a program guide or play list does not have a closed-captioning window displayed thereon. One advantage of the disclosure is that the client device can control the display of closed-captioning without knowledge of the current content. The server device can control the closed-captioning on the client based on the program content law, without knowledge of the closed-captioning settings within the client device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   communicating content from a server device to a client device;
   communicating a first remote user interface from the server device to the client device;
   displaying the first remote user interface at the client device;
   communicating key signals from the first remote user interface to the server device;
   communicating a first transfer control signal from the server device to the client device;
   displaying a client native interface generated within the client device at the client device;
   communicating a second transfer control signal from the client native interface to the server device;
   thereafter, communicating a second remote user interface from the server device to the client device; and
   thereafter, displaying the second remote user interface at the client device.

2. A method as recited in claim 1 wherein communicating content comprises communicating a content stream streaming content from the server device to the client device.

3. A method as recited in claim 1 wherein communicating content comprises communicating content through a local area network.

4. A method as recited in claim 1 wherein communicating a second transfer control signal comprises communicating a second transfer control signal from the server device to the client device through a local area network.

5. A method as recited in claim 1 wherein communicating a first transfer control signal comprises communicating the first transfer control signal having a user interface element.

6. A method as recited in claim 5 wherein displaying a client native interface comprises displaying the client native interface based on the user interface element.

7. A method as recited in claim 1 wherein communicating a second transfer control signal comprises communicating the second transfer control signal having a user interface element.

8. A method as recited in claim 7 wherein displaying a client native interface comprises displaying the client native interface based on the user interface element.

9. A method as recited in claim 1 wherein communicating a second transfer control signal comprises communicating the second transfer control signal having a remote key element.

10. A method as recited in claim 1 wherein communicating a second transfer control signal comprises communicating the second transfer control signal having a remote key element and a user interface element.

11. A method as recited in claim 10 further comprising generating the second remote user interface based on the remote key element.

12. A system comprising:
    a client device; and
    a server device that communicates a first remote user interface from the server device to the client device;
    wherein said client device displays the first remote user interface and communicates key signals from the first remote user interface to the server device;
    wherein the server device communicates a first transfer control signal to the client device;
    wherein said client device displays a client native interface generated at the client device and communicates a second transfer control signal from the client native interface to the server device;
    wherein the server device communicates a second remote user interface to the client device;
    wherein said client device displays the second remote user interface at the client device.

13. A system as recited in claim 12 wherein the server device communicates streaming content to the client device.

14. A system as recited in claim 12 further comprising a local area network and wherein the server device communicates streaming content to the client device through the local area network.

15. A system as recited in claim 14 wherein the server device communicates the first transfer control signal to the server device through a local area network.

16. A system as recited in claim 12 wherein the first transfer control signal comprises a user interface element.

17. A system as recited in claim 16 wherein the client device displays the client native interface based on the user interface element.

18. A system as recited in claim 12 wherein the second transfer control signal comprises a user interface element.

19. A system as recited in claim 18 wherein the client device displays client native interface based on the user interface element.

20. A system as recited in claim 12 wherein the second transfer control signal comprise a remote key element.

21. A system as recited in claim 12 wherein the second transfer control signal comprises a remote key element and a user interface element.

22. A system as recited in claim 21 wherein the server generates the second user interface based on the remote key element and a user interface element.

* * * * *